United States Patent [19]
Otsuki et al.

[11] Patent Number: 4,715,667
[45] Date of Patent: Dec. 29, 1987

[54] HYDRAULIC PRESSURE CONTROL DEVICE FOR USE IN VEHICLE ANTI-SKID BRAKING SYSTEM

[75] Inventors: Hiromi Otsuki, Anjo; Kenichi Numata, Chiryu; Ryoichi Matsuura, Anjo; Yoshihisa Nomura; Nobuyasu Nakanishi, both of Toyota; Hiroyuki Oka, Susono, all of Japan

[73] Assignees: Nippondenso Co., Ltd., Kariya; Toyota Jidosha Kabushiki Kaisha, Toyota, both of Japan

[21] Appl. No.: 873,272

[22] Filed: Jun. 6, 1986

Related U.S. Application Data

[63] Continuation-in-part of Ser. No. 760,982, Jul. 31, 1985, abandoned.

[30] Foreign Application Priority Data

Aug. 9, 1984 [JP] Japan ................. 59-167628

[51] Int. Cl.$^4$ .............. B60T 8/00/8/36; B60T 13/68; B60T 15/02
[52] U.S. Cl. ..................... 303/119; 303/68; 303/116
[58] Field of Search ............... 303/113–119, 303/61–63, 68–69, 10–12, 100, 6 R, 98; 188/181; 303/93, 110

[56] References Cited

U.S. PATENT DOCUMENTS

| | | | |
|---|---|---|---|
| 3,521,934 | 7/1970 | Leiber | 303/10 X |
| 3,532,391 | 10/1970 | Klein | 303/119 |
| 3,556,610 | 1/1971 | Leiber | 303/119 X |
| 3,819,236 | 6/1974 | Fink et al. | 303/119 |
| 3,866,983 | 2/1975 | Kondo | 303/119 |
| 4,090,739 | 3/1978 | Iio | 303/10 |
| 4,099,793 | 7/1978 | Iio | 303/116 |
| 4,278,300 | 7/1981 | Bacher | 303/115 |
| 4,395,073 | 7/1983 | Arikawa et al. | 303/116 |
| 4,602,824 | 7/1986 | Nishimura et al. | 303/119 X |
| 4,603,920 | 8/1986 | Otsuki et al. | 303/119 X |
| 4,605,263 | 8/1986 | Ando et al. | 303/116 |
| 4,611,859 | 9/1986 | Otsuki et al. | 303/119 X |
| 4,618,189 | 10/1986 | Nakanishi et al. | 303/119 X |
| 4,636,009 | 1/1987 | Tsuru et al. | 303/116 X |
| 4,640,558 | 2/1987 | Nomura et al. | 303/119 |
| 4,668,024 | 5/1987 | Nakanishi et al. | 303/69 X |

FOREIGN PATENT DOCUMENTS

| | | | |
|---|---|---|---|
| 0156323 | 10/1985 | European Pat. Off. | 303/119 |
| 2945444 | 5/1981 | Fed. Rep. of Germany | 303/119 |
| 0004971 | 1/1977 | Japan | 303/119 |
| 56-142733 | 11/1981 | Japan . | |
| 0088669 | 5/1985 | Japan | 303/119 |

*Primary Examiner*—Douglas C. Butler
*Attorney, Agent, or Firm*—Cushman, Darby & Cushman

[57] ABSTRACT

A hydraulic pressure control device in a vehicle anti-skid braking system includes a brake master cylinder, a wheel brake actuating cylinder for braking a wheel in response to a fluid pressure from the brake master cylinder, and a directional control valve actuatable in response to a control signal from a control unit which detects a wheel condition such as wheel skidding, for returning a braking fluid from the wheel brake actuating cylinder via a return passage to a fluid pressure supply passage connected to the master cylinder. The return passage has an accumulator for storing part of the fluid from the wheel brake actuating cylinder in an anti-skid control mode. A fluid overflow from the accumulator is delivered via a restriction in the supply passage to the master cylinder to act on the brake pedal as a pedal reaction.

6 Claims, 5 Drawing Figures

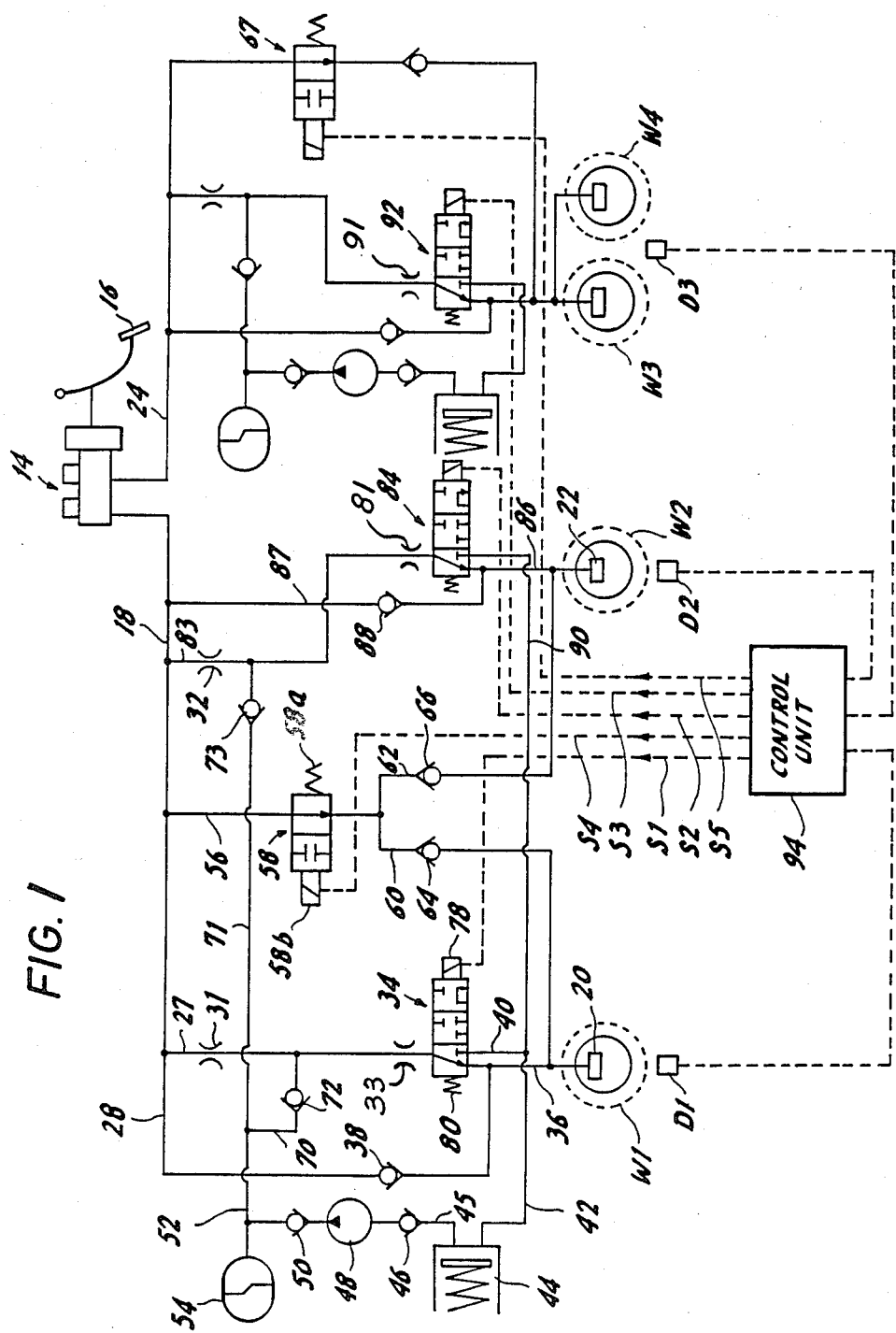
FIG. I

HYDRAULIC PRESSURE CONTROL DEVICE FOR USE IN VEHICLE ANTI-SKID BRAKING SYSTEM

This is a continuation-in-part of application Ser. No. 760,982 filed July 31, 1985, now abandoned.

BACKGROUND OF THE INVENTION

The present invention relates generally to a vehicle anti-skid braking system, and more particularly to a hydraulic pressure control device having means for giving the driver an appropriate brake pedal reaction in such a vehicle anti-skid braking system.

Various anti-skid braking systems for use in motor vehicles have been proposed and used for optimizing a hydraulic braking pressure under the control of a control unit to provide a more effective and safer braking action when the vehicle is braked in different road conditions. U.S. Pat. Nos. 4,090,739 and 4,278,300, for example, illustrate such anti-skid braking systems. However, prior anti-skid braking systems have proven unsatisfactory in that the brake pedal is subjected to a kickback during operation of the system. More specifically, when the directional control valve is shifted under the control of the control unit to reduce the braking fluid pressure in a pressure-decreasing mode, the braking fluid is discharged from the brake actuating cylinders in vehicle wheels into a reservoir, from which the braking fluid is pumped by a hydraulic pressure pump back to a supply pipe connected to the master cylinder. When the wheels are in the anti-skid control mode while they are being braked, the braking fluid discharged from the brake actuating cylinders and pumped back to the master cylinder acts on the brake pedal as a kickback, giving the driver a bad pedal feeling.

To solve the above problem, various efforts have been made to prevent the braking fluid discharged into the supply pipe from flowing back into the master cylinder when the directional control valve is in the pressure-decreasing mode. One prior arrangement for achieving such a function is disclosed in Japanese Laid-Open Patent Publication No. 56-142733 published on Nov. 7, 1981.

The disclosed hydraulic pressure control device has proven effective in completely eliminating the undesirable kickback and also any pedal reaction to be felt by the driver's foot. One problem with this prior hydraulic pressure control device is that since there is no pedal reaction whatsoever during the anti-skid control mode, the driver cannot confirm whether the vehicle wheels are under the anti-skid control or not.

SUMMARY OF THE INVENTION

It is an object of the present invention to provide a hydraulic pressure control device in vehicle anti-skid braking systems which is capable of giving the driver an appropriate pedal reaction to enable the driver to confirm the proper operation of the anti-skid braking system in the anti-skid control mode.

According to the present invention, there is provided a hydraulic pressure control device in a vehicle anti-skid braking system, including a master cylinder, a wheel brake actuating cylinder, a fluid pressure supply passage connected between the master cylinder and the wheel brake actuating cylinder for supplying a braking fluid under pressure from the master cylinder to the wheel brake actuating cylinder, a control unit responsive to a wheel condition for generating a control signal, a directional control valve disposed in the fluid pressure supply passage and having at least first and second selective positions, the directional control valve being normally shifted to the first position to open the fluid pressure supply passage, a fluid pressure return passage connected between the directional control valve and the fluid pressure supply passage, the directional control valve being actuatable in response to the control signal for connecting the wheel brake actuating cylinder to the fluid pressure return passage to return a braking fluid under pressure from the wheel brake actuating cylinder to the fluid pressure supply passage in bypassing relation to the directional control valve, a reservoir disposed in the fluid pressure return passage for storing the braking fluid, a hydraulic pressure pump disposed in the fluid pressure return passage for pumping the braking fluid from the reservoir, an accumulator disposed in the fluid pressure return passage for storing part of the braking fluid from the hydraulic pump, and a restriction disposed in the fluid pressure supply passage between the master cylinder and the junction between the fluid pressure supply and return passages.

BRIEF DESCRIPTION OF THE DRAWINGS

The present invention will be described in detail by way of illustrative example with reference to the accompanying drawings, in which:

FIG. 1 is a schematic diagram of a hydraulic pressure control device according to an embodiment of the present invention in a vehicle anti-skid braking system;

DETAILED DESCRIPTION

Figure 2A:
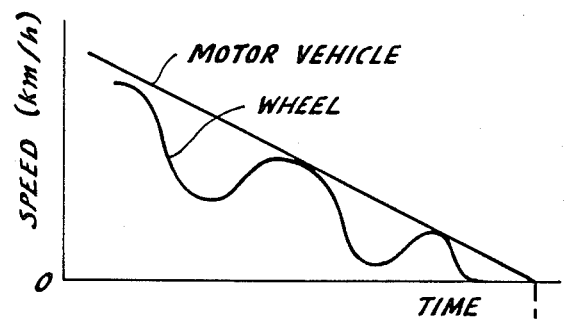
FIGS. 2A, 2B and 2C are graphs showing the control timing in an anti-skid control mode of the hydraulic pressure control device shown in FIG. 1.

Like or corresponding parts are denoted by like or corresponding reference characters in several views.

As shown in FIG. 1, a hydraulic pressure control device in a vehicle anti-skid braking system includes a master cylinder 14 operatively coupled with a brake pedal 16. The master cylinder 14 has a first hydraulic pressure generating chamber (not shown) connected through a pipe 18 to brake actuating cylinders 20, 22 for front wheels W1, W2. The master cylinder 14 also has a second hydraulic pressure generating chamber (not shown) connected through a pipe 24 to brake actuating cylinders for rear wheels W3, W4. More specifically, the pipe 18 is branched into a supply pipe 26 and a return pipe 28. The supply pipe 26 is connected through a restriction 30, a directional control valve 34, a restriction 33 and a pipe 36 to the brake actuating cylinder 20 for the front wheel W1. The restriction 33 has a diameter larger than that of the restriction 30.

The return pipe 28 is coupled through a check valve 38 and the pipe 36 to the brake actuating cylinder 20, the check valve 38 allowing the fluid to flow only in a direction from the brake actuating cylinder 20 to the master cylinder 14. A pipe 40 is connected to the directional control valve 34 and also connected through a pipe 42, a reservoir 44, a pipe 45, a check valve 46, a hydraulic pressure pump 48, a check valve 50, and a return pipe 52 to the supply pipe 26. The return pipe 52 has a check valve 53 allowing the fluid to flow only in a direction from the hydraulic pressure pump 48 to the supply pipe 26. An accumulator 54 is coupled to the return pipe 52 at a point between the check valves 50, 53. The return pipe 52 is connected to the supply pipe 26 at a point between the restriction 30 and the directional control valve 34. Therefore, the restriction 30 is located between the master cylinder 14 and the junction where the return pipe 52 is joined to the supply pipe 26. The accumulator 54 has a fluid storage capacity selected to be slightly (about 60% in the illustrated embodiment) smaller than the maximum amount of the fluid discharged from the brake actuating cylinder 20 in one pressure-decreasing stroke. The check valves 46, 50 are oriented such that they permit a fluid flow only in the direction in which the fluid is pumped by the hydraulic pressure pump 48 from the reservoir 44 to the accumulator 54. The check valve 46 serves as an intake valve of the pump 48 and is constructed integrally therewith, and the check valve 50 serves as a discharge valve of the pump 48 and is constructed integrally therewith.

The directional control valve 34 is a spring-biased solenoid-operated valve of the three-port and three-position type. When a high exciting current is passed through a solenoid 78 of the valve 34, the valve 34 is actuated to the leftmost (FIG. 1) or actuated position against the bias of a spring 80 of the valve 34. When a low exciting current is supplied to the solenoid 78, the valve 34 is positioned in an intermediate position. When no exciting current flows through the solenoid 78, the valve 34 is biased to the rightmost (FIG. 1) or normal position under the force of the spring 80.

To the brake actuating cylinder 22 of the other front wheel W2, there is connected a supply pipe 82 branched from the supply pipe 32 through a restriction 81, a directional control valve 84 identical structurally and functionally to the directional control valve 34 and a pipe 86. The restriction 81 has a diameter larger than that of the restriction 30. The brake actuating cylinder 22 is also connected to the master cylinder 14 through a return pipe 87 branched from the pipe 18, a check valve 88, and a pipe 86. A pipe 90 connected to the directional control valve 84 is connected through the pipe 42 to the reservoir 44.

A pipe 56 branched from the pipe 18 is connected through a two-position two-way valve 58 to a pair of parallel pipes 60, 62 coupled via check valves 64, 66, respectively, to the pipes 36, 86. The check valves 64, 66 are oriented to allow the fluid to flow only toward the brake actuating cylinders 20, 22, respectively, through the pipes 36, 86. The two-position two-way valve 58 is normally biased by a spring 58a permit fluid communication between the pipe 36 and the pipes 60, 62. When a solenoid 58b of the two-position two-way valve 58 is energized, the valve 58 is shifted against the bias of the spring 58a to shut off the fluid communication between the pipe 36 and the pipes 60, 62.

The brake actuating cylinders of the rear wheels W3, W4 are connected to the pipe 24 through substantially the same arrangement as that for the front wheels W1, W2, except that the brake actuating cylinders are connected through a restrictor 91 to a common directional control valve 92 identical to the directional control valves 34, 84. Of course, two such directional control valves may be connected respectively to the brake actuating cylinders of the rear wheels W3, W4. A two-position two-way valve 67 identical in construction and function to the two-position two-way valve 58 is coupled between the pipe 24 and the brake actuating cylinders of the rear wheels W3, W4.

Wheel speed sensors D1, D2 are associated respectively with the front wheels W1, W2, and one speed sensor D3 is associated with the rear wheels W3, W4. The wheel speed sensors D1, D2, D3 generate pulse signals having frequencies proportional to the speeds of rotation of the wheels and apply such pulse signals to a control unit 94. The control unit 94 is responsive to the applied signals for computing wheel speeds, slip rates, decelerations to generate control signals S1, S2, S3, S4, S5. The control signals S1, S2, S3 are supplied to the solenoids of the directional control valves 34, 84, 92. When the control signal is of a high level, the solenoid exciting current is of a high level. When the control signal is of an intermediate level, the solenoid exciting current is also of an intermediate level. When the control signal is of a low level, then no solenoid exciting current flows. Therefore, when the control signals S1, S2, S3 are of high, intermediate, and low levels, respectively, the directional control valves 34, 84, 92 are moved to the actuated position, the intermediate position, and the normal position, respectively. The control signals will be high in level when the fluid pressure in the brake actuating cylinders 20, 22 is to be reduced. The control signals will be intermediate in level when the fluid pressure in the brake actuating cylinders 20, 22 is to be maintained. The control signals will be low in level when the fluid pressure in the brake actuating cylinders 20, 22 is to be increased. The directional control valve 92 is similarly controlled for braking the rear wheels W3, W4.

The control signals S4, S5 are supplied to the solenoids of the two-position two-way valves 58, 67, respectively. The control signals S4, S5 are generated to actuate these valves 58, 67 into the shut-off positions only when the wheels W1 through W4 are in the anti-skid control mode, i.e., when the directional control valves 34, 84, 92 are cyclically switched between pressure-increasing, pressure-maintaining, and pressure-decreasing modes for controlling the braking fluid pressure.

The control unit 94 of the above functions is of a simple conventional arrangement that could easily be achieved by those skilled in the art and hence will not be described in detail.

Operation of the hydraulic pressure control device thus constructed is as follows:

(i) Normal braking mode:

When the driver steps on the brake pedal 16, the braking fluid pressure is delivered from the master cylinder 14 through the pipes 18, 56, the two-way valve 58, the pipes 60, 62 to the brake actuating cylinders 20, 22 to brake the front wheels W1, W2. The braking fluid pressure is also delivered from the master cylinder 14 through the pipe 24 and the two-way valve 67 to the brake actuating cylinders of the rear wheels W3, W4 to brake the same. Since the braking fluid pressure is fed via the two-way valves 58, 67, the fluid pressures in the brake actuating cylinders of the wheels W1 through W4 can quickly be increased as required irrespectively of the restrictions (one indicated by 32) in the supply pipes.

(ii) Anti-skid control mode:

The driver now starts depressing the brake pedal 16 while the motor vehicle is running at a constant speed. At the time of starting braking the vehicle, the control unit 94 is responsive to detected signals from the wheel speed sensors D1 through D3 for determining that each wheel has not yet reached a prescribed deceleration and slip rate. The control signals S1, S2, S3 are therefore low in level, and the directional control valves 34, 84, 92 are in the normal position (shown in FIG. 1). The brake actuating cylinders of the wheels W1 through W4 are now in the pressure-increasing mode. The braking fluid pressure from the master cylinder 14 is applied through the pipe 18, the pipe 56, the pipes 60, 62, the check valves 64, 66, and also through the supply pipes 26, 82, the directional control valves 34, 84, and the pipes 36, 86 to the brake actuating cylinders 20, 22 to brake the front wheels W1, W2. The braking fluid is prevented by the check valves 38, 88 from flowing through the pipes 28, 87 into the pipes 36, 86. The braking fluid pressure is continuously delivered through the two-way valve 38 until the wheels W1, W2 reach the prescribed deceleration.

The rear wheels W3, W4 are braked in the same manner.

When the braking fluid pressure is increased and the front wheels W1, W2 reach and are just about to exceed the predetermined deceleration and slip rate, the control signal S4 goes high in level to close the two-way valve 58 to start the anti-skid control mode. At the same time, the control signals S1, S2 go high in level to shift the directional control valves 34, 84 toward the actuated position in which the pipes 26, 36 and the pipes 82, 86 are disconnected, and the pipes 36, 40 and the pipes 86, 90 are connected. The brake actuating cylinders 20, 22 are now in the pressure-decreasing mode. The braking fluid pressure is now delivered from the brake actuating cylinders 20, 22 through the pipes 36, 40, 86, 90, 42 into the reservoir 44. The fluid pressure pump 48 starts operating when either the control signal S1 or S2 reaches the high level, so that the braking fluid is pumped by the pump 48 from the reservoir 44 and then delivered through the check valve 50 and the return pipe 52 into the accumulator 54. When the fluid is supplied to the accumulator 54 up to its maximum storage capacity, the fluid is thereafter delivered from the return pipe 52 into the supply pipe 26.

The pressure energy of the braking fluid is stored in the accumulator 54. Until the delivered amount of the braking fluid exceeds the capacity of the accumulator 54, the fluid pressure in the accumulator 54 is lower than the fluid pressure in the master cylinder 14, and hence no braking fluid flows back into the supply pipe 26. Therefore, no fluid pressure acts on the brake pedal 16 as a kickback. Inasmuch as the fluid storage capacity of the accumulator 54 is smaller than the maximum amount of the fluid discharged from the brake actuating cylinder 20 in one pressure-decreasing stroke, as described above, the braking fluid overflows from the accumulator 54 in such one pressure-decreasing stroke. The fluid overflow goes through the check valve 53 into the supply pipe 26. In one pressure-decreasing stroke, the accumulator 54 stores about 60% of the delivered braking fluid, and the remaining 40% of the braking fluid is fed via the supply pipes 26, 28 back to the master cylinder 14. At this time, the braking fluid pressure is reduced by the restriction 30, and any kickback acting on the brake pedal 16 is small and felt by the driver's foot as a suitable pedal reaction. In FIG. 2B, the braking pressure transients a, b, and c indicates pressure-decreasing modes. The fluid discharged from the brake actuating cylinders 20, 22 in such pressure-decreasing modes is partly stored in the accumulator 54, and the overflow is delivered through the restriction 30 back to the master cylinder 14 to produce the pedal reaction.

The same operation as described above is carried out with respect to the rear wheels W3, W4. Therefore, the brake pedal 16 is subjected to only a small kickback which is felt as a suitable pedal reaction.

When the deceleration of the wheels W1, W2 restores a prescribed level and is about to become lower than the prescribed level, the control signals have the intermediate level to actuate the directional control valves 34, 84 into the intermediate or neutral position. The pipes 26, 36, and 40, and the pipes 82, 86, and 90 are then disconnected. The braking fluid pressure now remains maintained at a constant level. The brake actuating cylinders 20, 22 are now in the pressure-maintaining mode. The above operation holds true for the rear wheels W3, W4.

When there is no danger of skidding of the wheels W1, W2, the control signals S1, S2 go low in level to provide fluid communication between the pipes 26, 36 and the pipes 82, 86 to allow the fluid pressure to go from the accumulator 54 through the pipes 26, 82 into the pipes 36, 86, respectively. The braking force on the front wheels W1, W2 is now increased. Likewise, the braking force on the rear wheels W3, W4 is also increased as the control signal S3 also goes low in level.

At this time, the fluid pressure delivered to the directional control valves 34, 84 is reduced by the orifice 30 in the pipe 26, and the braking fluid tends to flow from the master cylinder 14 and the accumulator 54. Since the braking fluid from the master cylinder 14 is limited by the restriction 30, the amount of the braking fluid fed from the master cylinder 14 is smaller than that of the braking fluid from the accumulator 54, with the result that the brake pedal 16 is depressed to a smaller depth. The restrictions 33, 81 serve to smooth the fluid pressure applied from the master cylinder 14 and the accumulator 54 to the directional control valves 34, 84. In addition, the restrictions 33, 81, which are larger in diameter than the restriction 30, allow the fluid pressure to flow from the accumulator 54 toward the directional control valves 34, 84 so that the stored fluid pressure can be discharged from the accumulator 54. The braking pressure transients e, f, g, h, i, j, k in FIG. 2B indicates pressure-increasing modes alternating with pressure-maintaining modes for progressively increasing the braking pressure. The brake pedal 16 is depressed to a progressively smaller extent each time the brake actuating cylinders operate in the pressure-increasing mode, thus giving an appropriate pedal reaction to the driver's foot.

The above control operation is repeated until the motor vehicle reaches a desired speed or is stopped, whereupon the driver releases the brake pedal 16. The pressure in the portions of the return pipes 28, 87, which are closer than the check valves 38, 88 to the master cylinder 14, is lowered to permit the braking fluid to return from the cylinders 20, 22 through the pipes 36, 28, 18 and the pipes 86, 87, 18 back into the master cylinder 14. The braking fluid from the brake actuating cylinders of the rear wheels W3, W4 is also returned to the master cylinder 14 in the same manner.

The two-way valves 58, 67 are shifted back to the normal communicating position.

Figure 2B:
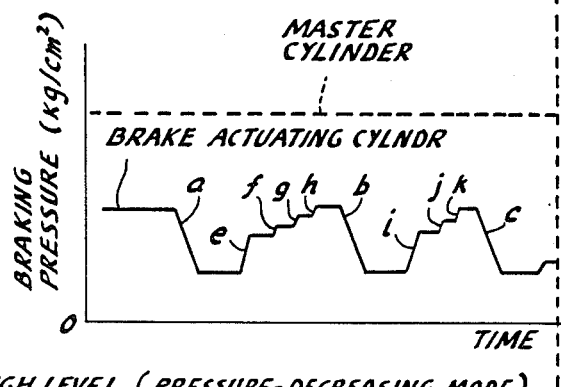

FIG. 2A shows the speed of the motor vehicle and the speed of the wheels at the time the motor vehicle is braked in the anti-skid control mode.

Figure 2C:
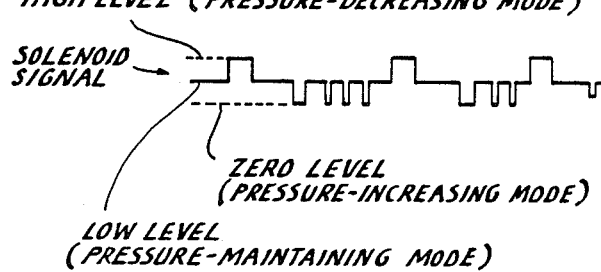

FIG. 2C illustrates the different levels of the signal applied by the control unit 94 to each of the solenoids of the direction control valves 34, 84, 92.

Figure 3:
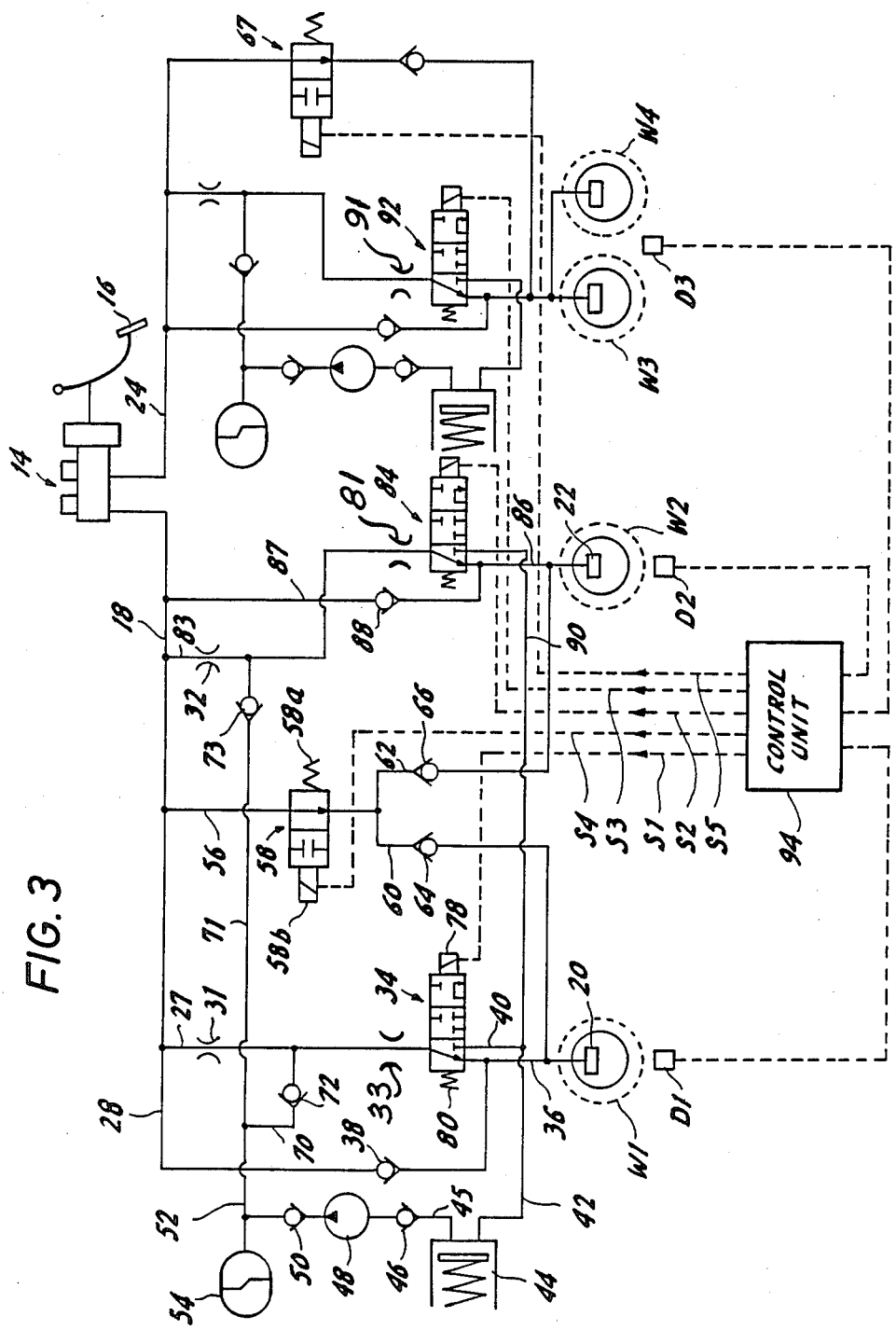
FIG. 3 is a schematic diagram of a hydraulic pressure control device according to another embodiment of the present invention in a vehicle anti-skid braking system.

FIG. 3 illustrates a hydraulic pressure control device according to another embodiment of the present invention. The hydraulic pressure control device shown in FIG. 3 differs from that of FIG. 1 in that the pipe 18 is branched into supply pipes 27, 83 connected through restrictions 31, 32, respectively, and the restrictions 33, 81, respectively, to the directional control valves 34, 84, and the return pipe 52 is branched into pipes 70, 71 coupled via check valves 72, 73, respectively, to the supply pipes 27, 83 at points between the restrictions 31, 32 and the restriction 33, 81.

The rear wheels W3, W4 may be associated with respective wheel speed sensors for enabling the control unit 94 to generate control signals for the respective brake actuating cylinders of the rear wheels W3, W4. The brake actuating cylinders 20, 22 of the front wheels W1, W2 may be controlled by a common directional control valve. The directional control valves 34, 84, 92 may be of another design for providing only pressure-increasing and pressure-decreasing modes dependent on the extent to which the wheels skid.

Although certain preferred embodiments of the present invention have been shown and described in detail, it should be understood that various changes and modifications may be made therein without departing from the scope of the appended claims.

We claim:

1. A hydraulic pressure control device in a vehicle anti-skid braking system, comprising:
   (a) a brake master cylinder;
   (b) a wheel brake actuating cylinder;
   (c) a fluid pressure supply passage connected between said master cylinder and said wheel brake actuating cylinder for supplying a braking fluid under pressure from said master cylinder to said wheel brake actuating cylinder;
   (d) control means responsive to a wheel condition, for generating a control signal;
   (e) a directional control valve disposed in said fluid pressure supply passage and having at least first and second selective positions, said directional control valve being normally shifted to said first position to open said fluid pressure supply passage;
   (f) a fluid pressure return passage connected between said directional control valve and said fluid pressure supply passage in bypassing relation to said directional control valve, said directional control valve being actuatable in response to said control signal for connecting said wheel brake actuating cylinder to said fluid pressure return passage to return a braking fluid under pressure from said wheel brake actuating cylinder to said fluid pressure supply passage in bypassing relation to said directional control valve;
   (g) a reservoir disposed in said fluid pressure return passage for storing the braking fluid;
   (h) a hydraulic pressure pump disposed in said fluid pressure return passage for pumping the braking fluid from said reservoir;
   (i) an accumulator disposed in said fluid pressure return passage for storing part of the braking fluid from said hydraulic pump;
   (j) a first restriction disposed in said fluid pressure supply passage between said master cylinder and the junction between said fluid pressure supply and return passages;
   (k) a second restriction disposed in said fluid pressure supply passage between said directional control valve and the junction between said fluid pressure supply and return passages, said first restriction having a diameter smaller than the diameter of said second restriction; and
   (l) a check valve disposed in said fluid pressure return passage for allowing the braking fluid to flow in one direction only, said direction being from said accumulator into said fluid pressure supply passage.

2. A hydraulic pressure control device according to claim 1, including a two-way valve connected between said master cylinder and said wheel brake actuating cylinder in bypassing relation to said directional control valve for providing fluid communication between said master cylinder and said wheel brake actuating cylinder through the two-way valve in bypassing relation to said directional control valve, said two-way valve being responsive to the control signal from said control unit for shutting off the fluid communication through the two-way valve.

3. A hydraulic pressure control device according to claim 1, wherein said accumulator has a fluid storage capacity of approximately 60% of the braking fluid pumped from said hydraulic pressure pump, the remaining 40% of the braking fluid being deliverable as an overflow through said first restriction to said master cylinder to produce a reduced kickback reaction on a brake pedal associated with the master cylinder.

4. A hydraulic pressure control device in a vehicle anti-skid braking system, comprising:
   (a) a brake master cylinder;
   (b) a pair of wheel brake actuating cylinders;
   (c) a pair of first and second fluid pressure supply passages connected between said master cylinder and said wheel brake actuating cylinders for supplying a braking fluid under pressure from said master cylinder to said wheel brake actuating cylinders;
   (d) a control unit responsive to a wheel condition for generating a control signal;
   (e) a pair of directional control valves disposed in said first and second fluid pressure supply passages and having at least first and second selective positions, said directional control valves being normally shifted to said first position to open said first and second fluid pressure supply passages;
   (f) a fluid pressure return passage connected between said directional control valves and said fluid pressure supply passages in bypassing relation to the directional control valves, said directional control valves being actuatable in response to said control signal for connecting said wheel brake actuating cylinders to said fluid pressure return passage to return a braking fluid under pressure from said wheel brake actuating cylinders to said fluid pressure supply passages in bypassing relation to said directional control valves;
   (g) a reservoir disposed in said fluid pressure return passage for storing the braking fluid;
   (h) a hydraulic pressure pump disposed in said fluid pressure return passage for pumping the braking fluid from said reservoir;
   (i) an accumulator disposed in said fluid pressure return passage for storing part of the braking fluid from said hydraulic pump;
   (j) a pair of first and second restrictions disposed in said first and second fluid pressure supply passages, respectively, between said master cylinder and the junctions between said fluid pressure supply and return passages;

(k) another pair of third and fourth restrictions disposed in said first and second fluid pressure supply passages, respectively, between said directional control valves and the junctions between said fluid pressure supply and return passages, said first and second restrictions having respective diameters smaller than the diameters of said third and fourth restrictions, respectively; and (l) a pair of first and second check valves disposed in said fluid pressure return passage for allowing the braking fluid to flow only from said accumulator into said fluid pressure supply passages, respectively.

5. A hydraulic pressure control device according to claim 4, including a two-way valve connected between said master cylinder and said wheel brake actuating cylinder in bypassing relation to said directional control valves for providing fluid communication between said master cylinder and said wheel brake actuating cylinders through the two-way valve in bypassing relation to said directional control valves, said two-way valve being responsive to the control signal from said control unit for shutting off the fluid communication through the two-way valve.

6. A hydraulic pressure control device according to claim 4, wherein said accumulator has a fluid storage capacity of approximately 60% of the braking fluid pumped from said hydraulic pressure pump, the remaining 40% of the braking fluid being deliverable as an overflow through said first and second restrictions to said master cylinder to produce a reduced kickback reaction on a brake pedal associated with the master cylinder.

* * * * *